Patented Dec. 8, 1942

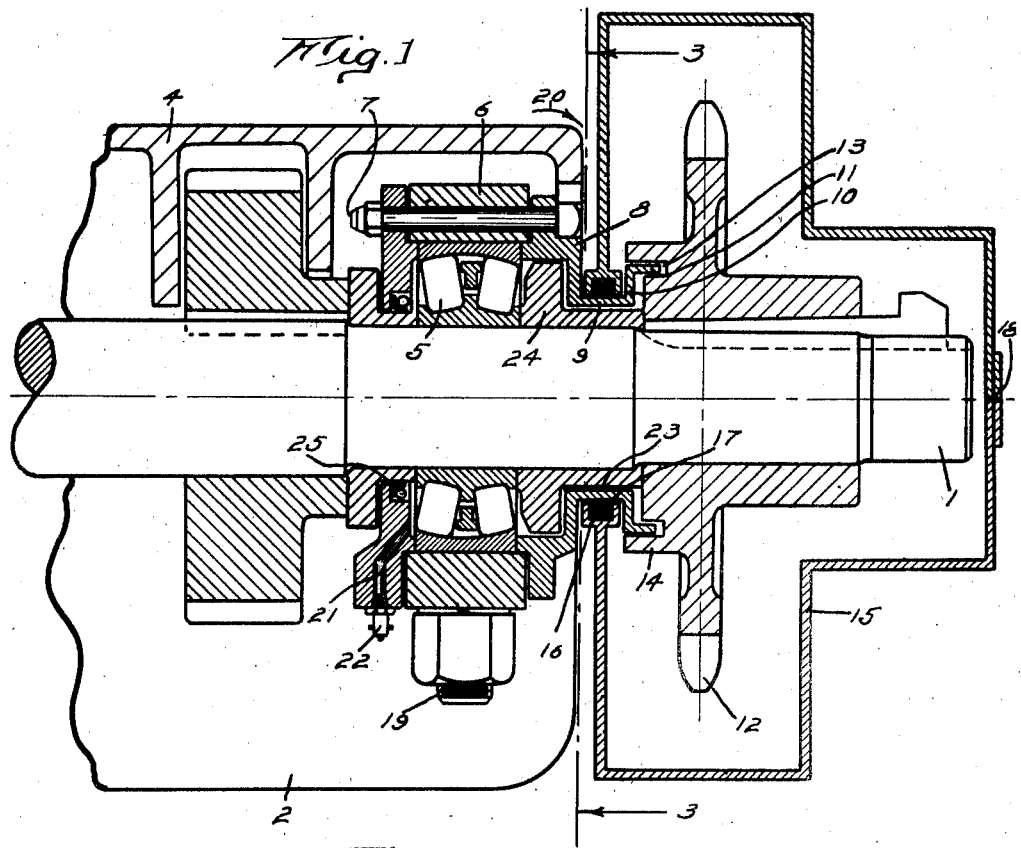
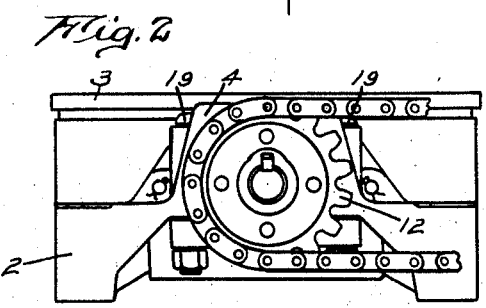
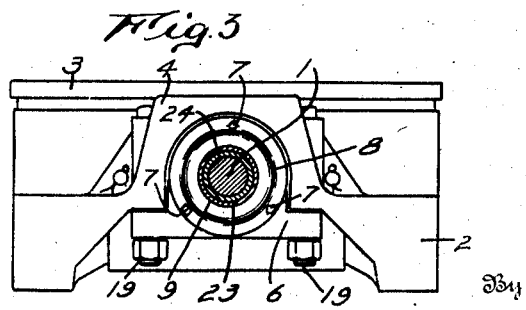

2,304,389

UNITED STATES PATENT OFFICE 2,304,389

BEARING MOUNTING

Forrest J. Young, Los Angeles, Calif., assignor to The National Supply Company, Pittsburgh, Pa., a corporation of Pennsylvania Application December 18, 1939, Serial No. 309,707

5 Claims. (Cl. 308—187.1)

This invention relates to bearing mountings and more particularly to a bearing mounting for a horizontally disposed shaft, and deals particularly with the construction of such mountings so as to exclude foreign matter from the bearings of such mounting.

It is an object of my invention to provide a bearing mounting including a housing having a bearing therein for supporting a horizontally positioned shaft and including a means for forming a labyrinth seal between the bearing housing and a rotary member mounted upon the shaft in position to prevent admission of foreign matter into the said bearing.

Another object of this invention is to provide a bearing mounting including a housing having a bearing therein for supporting a shaft wherein a member is provided forming a labyrinth seal between the shaft and the bearing housing, said member providing a channel for carrying foreign matter away from the bearing.

Other objects and advantages of this invention it is believed will be apparent from the following detailed description of a preferred embodiment thereof as illustrated in the accompanying drawing.

In the drawing:

Figure 1 is a side elevation of a rotary machine partly in vertical section illustrating a bearing mounting embodied in my invention.

Figure 2 is an end view of the rotary machine as illustrated in Figure 1 with the chain guard removed.

Figure 3 is a sectional end view taken substantially upon the line 3—3 of Figure 1.

In the preferred embodiment of my invention as illustrated in the accompanying drawing, I have illustrated the same as utilized in connection with the mounting of the drive or pinion shaft 1 of a rotary machine used in connection with the drilling of wells for the recovery of oil, gas, water or the like. This rotary machine includes a base 2 upon which the rotary table 3 is mounted. The rotary table 3 is driven through a suitable gear connection from the shaft 1. In this particular adaptation of my invention the shaft 1 is assembled from below, that is, the housing 4 is integrally formed with the base 2 so that the shaft is assembled through an opening in the bottom of the base 2.

There are ordinarily two bearings provided for supporting the shaft 1, but my invention is particularly illustrated as adapted to the mounting of the outer bearing 5 and for protecting that bearing from foreign matter such as rotary mud or the like. The bearing 5 is secured within a bearing housing 6 mounted within the base extension 4.

Secured to the housing 6 by means of bolts 7 is an annular closure ring 8. The closure ring 8 has a channel portion 9 of reduced diameter and is provided with a radial flange 10 and an outwardly directed annular rim 11.

Secured to the shaft 1 is a drive sprocket 12 which has an annular recess 13. The annular rim 11 fits within this annular recess 13. The sprocket 12 also has an overlapping cooperating annular rim 14 which overlies the annular rim 11 to provide a labyrinth restriction.

An oil-tight chain guard 15 is provided to encompass the outer end of the shaft 1 and surrounds the drive sprocket 12. The guard 15 may be provided with an annular packing carrier ring 16 surrounding the reduced portion 9 of the ring 8. Packing 17 may be mounted within the ring 16 within the channel 9 to form a fluid-tight seal. The guard 15 is preferably of the split construction with the upper and lower halves meeting along a joint 18. The bearing housing 6 is secured in position by means of bolts 19 which secure the said housing to the base extension 4.

It will be apparent from the foregoing that should drilling mud fall on the rotary machine and flow over the base extension 4 in the direction indicated by the arrow 20, that there is no way in which such rotary mud could work its way into the interior of the bearing 5. When the guard 15 is utilized, the mud is prevented by the packing 17 from entering the enclosure within the guard. When the guard 15 is not used, the mud simply falls into the annular channel 9 and flows by gravity around the side of the ring 8 to a point where it falls clear of the rotary machine.

It will be obvious from the foregoing that the closure member 9 need not be completely annular in shape but that certain of the benefits of this invention would be obtained should the channel be only a trough in the upper portion of the closure member 8. The chief requirement of such channel is of course that the bottom of the channel or trough be substantially below the highest point of entrance of the labyrinth restriction formed between the closure ring 8 and the sprocket 12.

Means are provided for introducing lubricant into the bearing 5, which means includes a grease inlet 21 which is provided with a grease fitting 22 and leads to the bearing 5. Each injection of grease through the fitting 22 is caused to traverse the bearing 5 and then pass through the clearance 23 between the relatively rotatable parts 8 and 24 and finally emerge at the outer end of the labyrinth restriction. It will be apparent that this path of grease movement is counter to the direction in which foreign matter must travel in order to reach the bearing 5. A seal 25 is provided to prevent the escape of grease, insuring that the direction of flow of grease will be as stated.

Having fully described my invention, it is to be understood that I do not wish to be limited to the details herein set forth, but my invention is of the full scope of the appended claims.

I claim:

1. In a bearing mounting, the combination of a bearing housing having a bearing supported therein, a horizontal shaft rotatably mounted in said bearing, a rotary member fixed upon said horizontal shaft, a stationary member secured to said bearing housing and encircling a portion of said horizontal shaft, cooperating parts on the said members disposed in telescopic relation to form a labyrinth restriction, means including a pressure fitting for injecting lubricant into said bearing at a point remote from said labyrinth restriction, sealing means operatively interposed between said bearing and said shaft and adapted to direct flow of lubricant so injected transversely through said bearing and out through said labyrinth restriction, and a trough-like channel on the upper side of said stationary member between the bearing housing and the rotary member adapted to carry away foreign matter.

2. In a bearing mounting, the combination of a bearing housing having a bearing supported therein, a horizontal shaft rotatably mounted in said bearing, a rotary member fixed upon said horizontal shaft, a stationary member secured to said bearing housing and encircling a portion of said horizontal shaft, cooperating parts on the said members disposed in telescopic relation to form a labyrinth restriction, means including a pressure fitting for injecting lubricant into said bearing at a point remote from said labyrinth restriction, sealing means operatively interposed between said bearing and said shaft and adapted to direct flow of lubricant so injected transversely through said bearing and out through said labyrinth restriction, and a trough-like channel on the upper side of said stationary member between the bearing housing and the rotary member adapted to carry away foreign matter, the bottom of said channel being disposed substantially below the highest portion of said labyrinth restriction.

3. In a bearing mounting, the combination of a bearing housing having a bearing supported therein, a shaft rotatably mounted in said bearing, a rotary member fixed upon said shaft, a stationary ring member encircling said shaft, said ring member being secured at one end to said bearing housing and cooperating at the other end with said rotary member to form a labyrinth restriction, means including a pressure fitting for injecting lubricant into said bearing at a point remote from said labyrinth restriction, sealing means operatively interposed between said bearing and said shaft and adapted to direct flow of lubricant so injected transversely through said bearing and out through said labyrinth restriction, said ring member having an annular channel positioned between the bearing housing and the rotary member and adapted to carry away foreign matter, the diameter of the bottom of said channel being substantially less than the outer diameter of the labyrinth restriction.

4. In combination with a shaft supported by bearing means, a drive member secured upon said shaft near one end thereof, power transmission means adapted to rotate said drive member, an enclosure member adapted to surround said drive member and said power transmission means, a housing for the bearing means, a stationary ring member encircling said shaft and extending from said bearing means to said drive member, said ring member being secured at one end to said bearing housing and cooperating at the other end with said drive member to form a labyrinth restriction, said stationary ring member having a central portion between the said ends of reduced diameter, a lateral opening in said enclosure member through which said shaft and stationary ring member extend, and packing means carried in said opening adapted to seal about the reduced portion of said stationary ring member.

5. In a bearing mounting, the combination of a bearing housing having a bearing supported therein, a shaft rotatably mounted in said bearing, a rotary member fixed relative to said shaft, a stationary member secured to said bearing housing and encircling a portion of said shaft, an outwardly projecting radial flange on said stationary member, an annular rim on said flange, an element associated with said rotary member adapted to overlap said annular rim in telescopic relation, and means for directing a flow of grease through said bearing and outwardly between the annular rim and said element, said means including a stationary grease seal associated with the housing and adapted to contact an element on the shaft.

FORREST J. YOUNG.